(12) United States Patent
Zhou et al.

(10) Patent No.: US 9,455,645 B1
(45) Date of Patent: Sep. 27, 2016

(54) SYSTEM AND METHOD FOR LEAKAGE CURRENT SUPPRESSION IN A PHOTOVOLTAIC CASCADED MULTILEVEL INVERTER

(71) Applicant: The Florida State University Research Foundation, Inc., Tallahassee, FL (US)

(72) Inventors: Yan Zhou, Tallahassee, FL (US); Hui Li, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 92 days.

(21) Appl. No.: 14/209,010

(22) Filed: Mar. 13, 2014

Related U.S. Application Data (60) Provisional application No. 61/780,119, filed on Mar. 13, 2013.

(51) Int. Cl.
*H02M 7/49* (2007.01)
*H02M 7/5387* (2007.01)

(52) U.S. Cl.
CPC .................................. *H02M 7/5387* (2013.01)

(58) Field of Classification Search
CPC ...... H02M 1/32; H02M 1/36; H02M 3/1584; H02M 5/458; H02M 5/4585; H02M 7/003; H02M 7/48; H02M 7/49; H02M 7/493
USPC ......... 363/34, 37, 50, 55, 56.01, 65, 71, 131
See application file for complete search history.

(56) References Cited

U.S. PATENT DOCUMENTS

| | | | | |
|---|---|---|---|---|
| 2,275,635 A * | 3/1942 | Lindenblad | ............. | H02M 3/15 307/84 |
| 4,052,657 A * | 10/1977 | Kleiner | ................... | H02M 7/49 363/43 |
| 4,719,550 A * | 1/1988 | Powell et al. | .................. | 363/37 |
| 5,552,976 A * | 9/1996 | Munro | .................... | B60L 9/005 363/132 |
| 5,684,683 A * | 11/1997 | Divan | ............... | H02M 3/33569 363/132 |
| 6,259,017 B1 * | 7/2001 | Takehara | .................. | G05F 1/67 136/244 |
| 7,072,194 B2 * | 7/2006 | Nayar | ....................... | H02J 7/35 363/65 |
| 7,564,703 B1 * | 7/2009 | Braun et al. | ..................... | 363/34 |
| 7,929,325 B2 * | 4/2011 | de Rooij | ........... | H02M 7/53871 363/71 |
| 8,031,495 B2 * | 10/2011 | Sachdeva | ................ | H02M 7/49 363/132 |

(Continued)

*Primary Examiner* — Adolf Berhane
(74) *Attorney, Agent, or Firm* — Molly L. Sauter; David Jacobs; Smith & Hopen, P.A.

(57) ABSTRACT

The cascaded multilevel inverter is considered to be a promising topology alternative for low-cost and high-efficiency photovoltaic (PV) systems. However, the leakage current issue, resulting from the stray capacitances between the PV panels and the earth, remains a challenge in the photovoltaic cascaded multilevel inverter application. The present invention presents leakage current suppression solutions for the PV cascaded multilevel inverter by introducing properly arranged and designed passive filters. The embodiments of the invention do not include an active semiconductor device, and as such, the leakage current suppression techniques of the present invention retain the simple structure of the cascaded inverter and do not complicate the associated control system.

12 Claims, 6 Drawing Sheets

(56) References Cited

U.S. PATENT DOCUMENTS

| | | | |
|---|---|---|---|
| 8,391,033 B2* | 3/2013 | Alexander | 363/50 |
| 8,488,351 B2* | 7/2013 | Serpa et al. | 363/80 |
| 8,653,931 B2* | 2/2014 | Xu et al. | 336/234 |
| 8,772,965 B2* | 7/2014 | El-Barbari | H02J 3/383 307/71 |
| 8,779,630 B2* | 7/2014 | Prior et al. | 307/113 |
| 8,873,260 B2* | 10/2014 | Voyer | H02M 3/07 323/271 |
| 9,030,854 B2* | 5/2015 | Escobar et al. | 363/40 |
| 2006/0158814 A1* | 7/2006 | Wasaki | H03H 7/09 361/118 |
| 2006/0227483 A1* | 10/2006 | Akagi | H02M 1/12 361/118 |
| 2008/0180262 A1* | 7/2008 | Yang | H04B 3/54 340/635 |

* cited by examiner

SYSTEM AND METHOD FOR LEAKAGE CURRENT SUPPRESSION IN A PHOTOVOLTAIC CASCADED MULTILEVEL INVERTER

CROSS-REFERENCE TO RELATED APPLICATIONS

This application claims priority to currently pending U.S. Provisional Patent Application No., 61/780,119, filed on Mar. 13, 2013 and entitled, "Leakage Current Suppression Solutions for Photovoltaic Cascaded Multilevel Inverter".

FEDERALLY SPONSORED RESEARCH OR DEVELOPMENT

This invention was made with Government support under Grant No. ECCS -1125658 awarded by National Science Foundation. The government has certain rights in the invention.

BACKGROUND OF THE INVENTION

To maximize the energy harvested from solar panels, cascaded multilevel inverter topology has been considered in photovoltaic (PV) applications for decades. The cascaded multilevel inverter topology features separate DC (direct current) inputs, making possible the string, or even panel level, maximum power point tracking. The energy harvested from the solar panels can be maximized in case of mismatch in the PV panels due to panel aging, shading effect or accumulation of dust in the panel surface. The cascaded structure can also generate high-quality output waveforms with each semiconductor of the cascaded inverter switching at lower frequency. Moreover, the number of cascaded modules can be extended to allow a transformerless connection to the grid. Consequently, the cascaded multilevel inverter topology can achieve greater DC/AC conversion efficiency. Additionally, compared with conventional central/string inverters, less expensive power semiconductors, having a lower voltage rating, can be utilized.

However, the transformerless structure of the cascaded inverters results in undesirable galvanic connections between the grid and the PV panels interfaced with separate cascaded inverters. Due to the parasitic capacitance between the PV panels and earth ground, circulating leakage current can flow through the panels and grid ground, leading to an undesirable increase of the output harmonic content, higher losses, safety concerns and electromagnetic interference problems.

Figure 1:
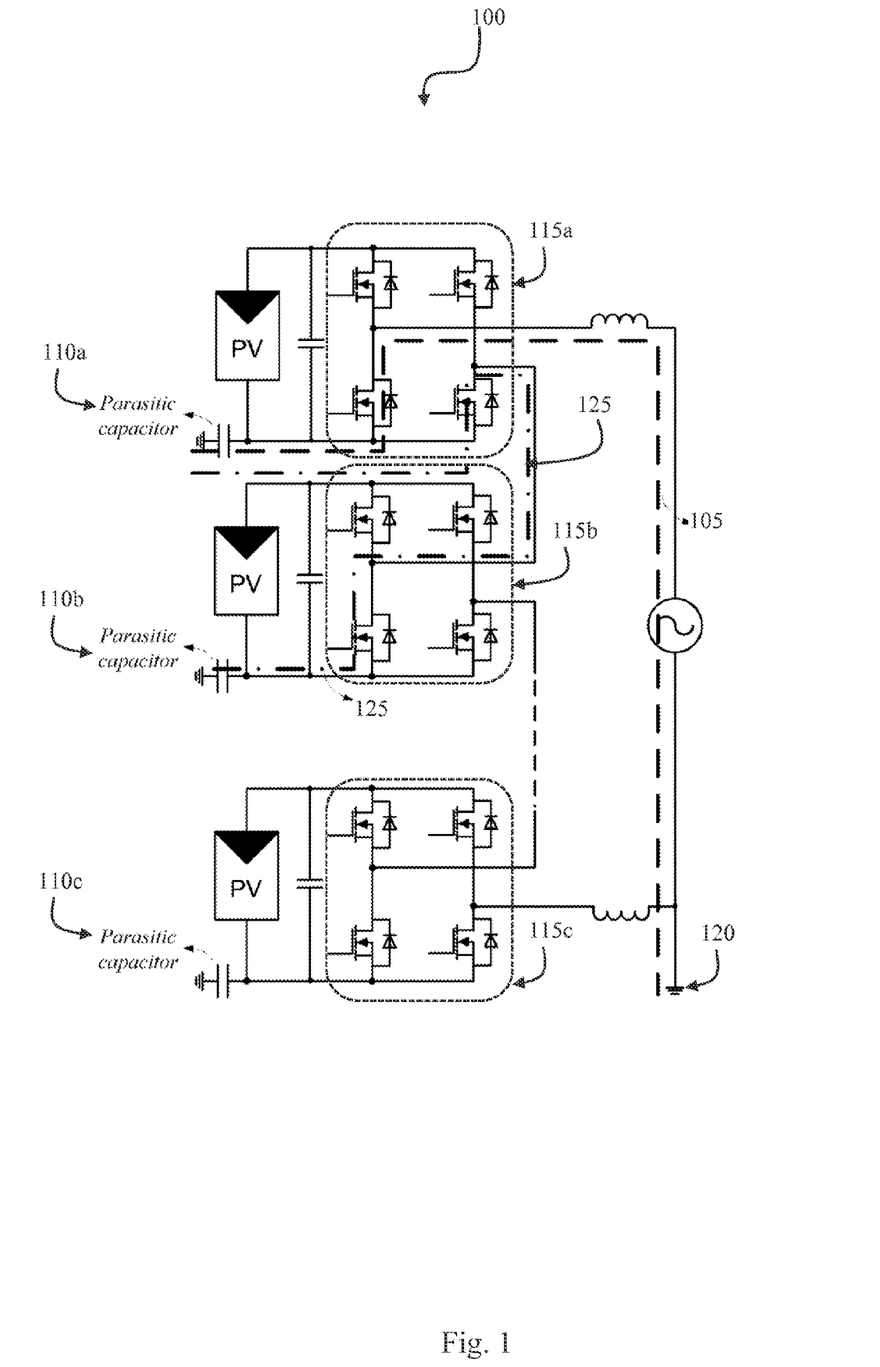
FIG. 1 is a circuit diagram illustrating the exemplary leakage current loops in a photovoltaic cascaded multilevel inverter.

In a PV cascaded multilevel inverter topology, two types of leakage current loops may exist. With reference to FIG. 1, in a PV cascaded multiple inverter 100, a first leakage current loop 105 is formed by the parasitic capacitance 110a, 110b, 110c, inverter-bridge 115a, 115b, 115c and grid ground 120. The second leakage current loop 125 is formed between the individual inverter bridges 115a, 115b, 115c of the cascaded multilevel inverter. The second leakage current loop 125 between the inverter bridges 115a, 115b, 115c is a capacitive coupling path exhibiting negligible inductance. The high-frequency pulse-width modulation (PWM) voltage of the cascaded inverter results in pulsewise leakage current in the second leakage current loop. In comparison to single transformerless inverters, the second leakage current loop is a unique leakage current loop in the cascaded multiple inverter topology. In addition, the second leakage current loop is present regardless of whether or not there is a transformer at the cascaded inverter output.

Leakage current suppression techniques for conventional single transformerless inverters have been well reported. However, there has been limited research regarding the leakage current issues in PV cascaded multilevel inverters. The leakage current issue present a challenge for the design of a reliable PV system based on a cascaded multilevel inverter. There exists a need in the art for a system and method that can produce a reliable PV system based on a cascaded multilevel inverter.

However, in view of the art considered as a whole at the time the present invention was made, it was not obvious to those of ordinary skill in the field of this invention how the shortcomings of the prior art could be overcome.

BRIEF SUMMARY OF THE INVENTION

This present invention relates to suppression techniques for a photovoltaic system based upon a multilevel cascaded inverter. More specifically, it relates to various embodiments for suppressing leakage current in a photovoltaic cascaded multilevel inverter.

A system for leakage current suppression in a photovoltaic cascaded multilevel inverter is provided. In one embodiment, the system includes a photovoltaic cascaded inverter, the photovoltaic cascaded inverter comprising one or more inverter modules and each of the one or more inverter modules comprising a DC-side and an AC-side. The system further includes a common mode DC-side choke coupled to the DC-side of each of the one or more inverter modules and a common mode AC-side choke coupled to the AC -side of each of the one or more inverter modules. The system further includes one or more common mode capacitors coupled to the DC-side of the one or more inverter modules and the parameters of the DC-side choke, AC-side choke and common mode capacitors are designed to suppress the leakage current of the photovoltaic cascaded multilevel inverter. In a particular embodiment, the DC-side choke, the AC-side choke and the common mode capacitors are designed to have a resonant frequency that is substantially lower than a switching frequency of the photovoltaic cascaded inverter.

In another embodiment, a system for leakage current suppression in a photovoltaic cascaded multilevel inverter includes a photovoltaic cascaded inverter, a common mode DC-side choke coupled to the DC-side of each of the one or more inverter modules, a common mode AC-side choke coupled to the AC-side of each of the one or more inverter modules, one or more DC-side circulating path capacitors coupled to the DC-side of the one or more inverter modules and one or more AC-side circulating path capacitors coupled to the AC-side of the one or more inverter modules. In this embodiment, the DC-side circulating path capacitors and the AC-side circulating path capacitors are connected at a common node and the DC-side choke, the AC-side choke, the DC-side circulating capacitors and the AC-side circulating capacitors are designed to have a resonant frequency that is substantially lower than a switching frequency of the photovoltaic cascaded inverter.

A method for suppressing leakage current in a photovoltaic cascaded multilevel inverter is provided wherein the leakage current is suppressed using a DC-side choke, an AC-side choke and a common mode capacitor coupled to the inverter modules of the photovoltaic cascaded multilevel inverter. In this method, the DC-side choke, the AC-side choke and the one or more common mode capacitors are designed to have a resonant frequency that is substantially lower than a switching frequency of the photovoltaic cascaded inverter.

In an additional embodiment, a method for suppressing leakage current in a photovoltaic cascaded multilevel inverter is provided wherein the leakage current is suppressed using a DC-side choke, an AC-side choke, one or more DC-side circulating path capacitors coupled to the DC-side of the one or more inverter modules and one or more AC-side circulating path capacitors coupled to the AC-side of the one or more inverter modules. In this method, the DC-side choke, the AC-side choke, the DC-side circulating capacitors and the AC-side circulating capacitors are designed to have a resonant frequency that is substantially lower than a switching frequency of the photovoltaic cascaded inverter.

Leakage current suppression technique for photovoltaic cascaded multilevel inverters is provided. The leakage current suppression system and method in accordance with the present invention provide a reliable PV system based upon a cascaded multilevel inverter.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 2:
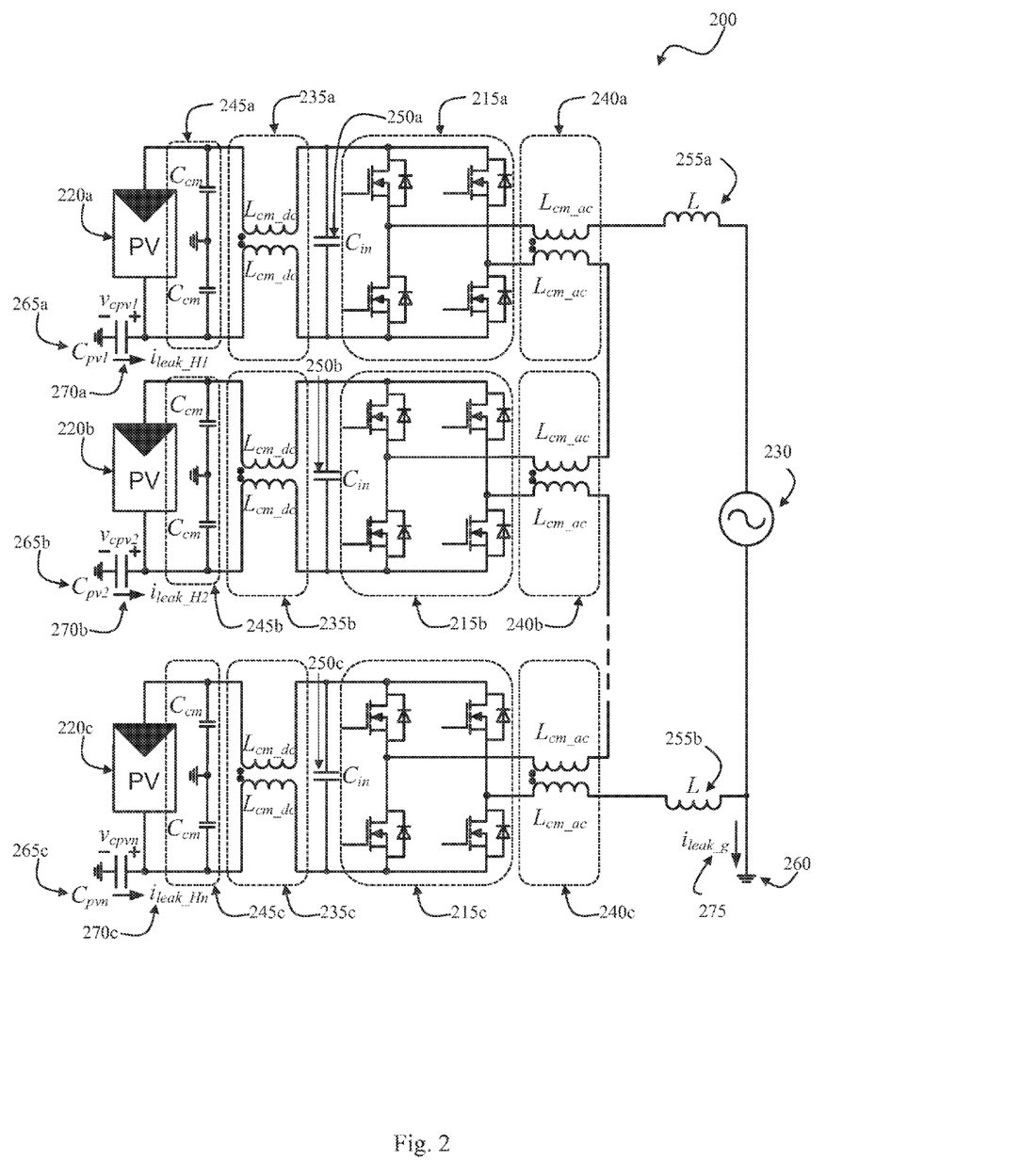
FIG. 2 is a circuit diagram of a PV cascaded multilevel inverter using a method of leakage current suppression in accordance with a first embodiment of the present invention.

With reference to FIG. 2, a first embodiment of the present invention is illustrated wherein AC (alternating current) side and DC (direct current) side common-mode (CM) filters $C_{cm}$, $L_{cm\_dc}$, and $L_{cm\_ac}$ are added to the multilevel cascaded inverter circuitry. As shown with reference to FIG. 2, a system for leakage current suppression in a photovoltaic cascaded multilevel inverter 200 includes, a photovoltaic cascaded inverter comprising one or more inverter modules 215a, 215b, 215c. Each of the inverter modules 215a, 215b, 215c has a DC-side and an AC-side. In this exemplary embodiment, the DC-side of the each of the inverter modules 215a, 215b, 215c is coupled to an element of photovoltaic array 220a, 220b, 220c and receives the DC source from the photovoltaic array. The photovoltaic cascaded inverter transforms the DC power source from the photovoltaic array to a source of AC power 230 on the AC-side of each of the inverter modules 215a, 215b, 215c. Each of the inverter modules 215a, 215b, 215c comprises a plurality of inverter circuits. In one embodiment, the plurality of inverter circuits of the inverter modules 215a, 215b, 215c may be configured as H-bridge inverter modules. In this embodiment, a common mode DC-side choke (inductor) 235a, 235b, 235c is coupled to the DC-side of each of the inverter modules 215a, 215b, 215c and a common mode AC-side choke 240a, 240b, 240c is coupled to the AC-side of each of the inverter modules 215a, 215b, 215c. Additionally, two common mode capacitors 245a, 245b, 245c are coupled to the DC-side of each of the inverter modules 215a, 215b, 215c. A DC-link capacitor 250a, 250b, 250c is coupled between the DC-side choke 235a, 235b, 235c and the DC-side of each of the one or more inverter modules 215a, 215b, 215c and two same split inductor 255a, 255b are coupled between the common mode AC-side choke 240a, 240b, 240c and a ground node 260, at the output of the photovoltaic cascaded inverter. A parasitic capacitor of the PV array for each cascaded module is designated as $C_{pvi}$, i=1,2, . . . , n, 265a, 265b, 265c. The current through the parasitic capacitor to be suppressed is designated as $i_{leak\_Hi}$, i=1,2, . . . , n. 270a, 270b, 270c and the leakage current flowing through the grid side to be suppressed is denoted as $i_{leak\_g}$ 275.

In operation of this embodiment, the leakage current of the PV multilevel cascaded inverter is limited by the low-pass LC filters formed by the PV array parasitic common mode capacitors 245a, 245b, 245c and the added CM filters formed by the DC-side chokes 235a, 235b, 235c and the AC-side choke 240a, 240b, 240c. The resonant frequencies of the LC filters are designed to be much lower than the inverter switching frequency. Therefore, the carrier harmonics across the parasitic capacitors 265a, 265b, 265c can be attenuated. However, the capacitance of the CM capacitors $C_{cm}$ 245a, 245b, 245c is usually limited by safety requirements, so the resonant frequency of the formed LC filter cannot be designed very low. Otherwise, large CM inductors are needed. Therefore, this embodiment is more suitable for the cascaded multilevel inverter operated at high switching frequency.

In the transformerless PV cascaded multilevel inverter with leakage current suppression 200 illustrated in FIG. 2, each cascaded inverter module is composed of a PV array 220a, 220b, 220c, DC-side CM choke $L_{cm\_dc}$ 235a, 235b, 235c, CM capacitors $C_{cm}$ 245a, 245b, 245c, DC-link capacitor $C_{in}$ 250a, 250b, 250c, H-bridge inverter 215a, 215b, 215c and AC-side CM choke $L_{cm\_ac}$ 240a, 240b, 240c. Additionally, there are two same split inductors L 255a, 255b at the total output of the inverter. A parasitic capacitor of the PV array for each cascaded module is designated as $C_{pvi}$, i=1,2, . . . n, 265a, 265b, 265c. The current through the parasitic capacitor to be suppressed is designated as $i_{leak\_Hi}$, i=1,2, . . . n. 270a, 270b, 270c and the leakage current flowing through the grid side to be suppressed is denoted as $i_{leak\_g}$ 275. The leakage current is suppressed by properly designing the parameters of $L_{cm\_ac}$, $L_{cm\_dc}$ and $C_{cm}$.

Figure 3:
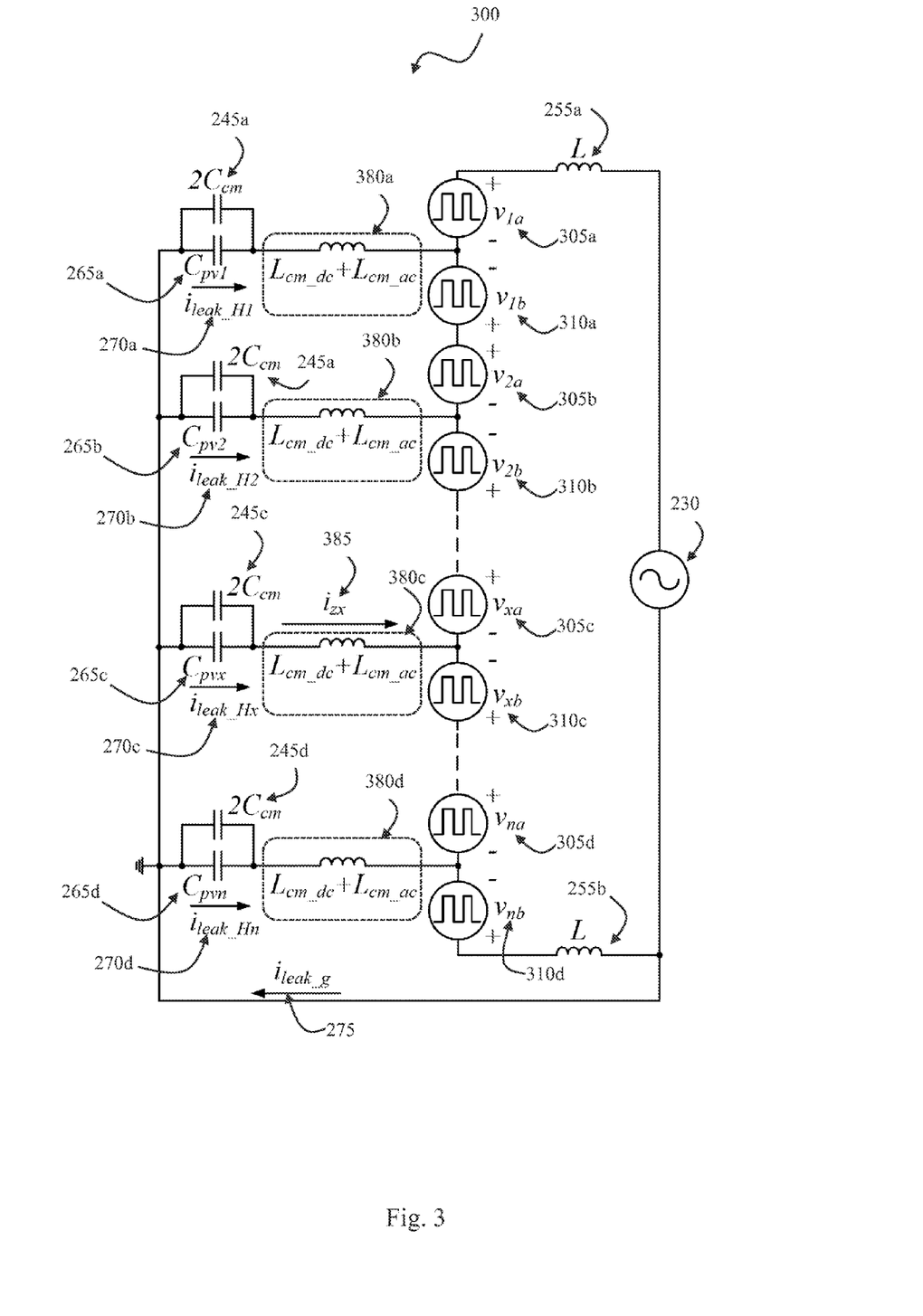
FIG. 3 is a circuit diagram illustrating an equivalent circuit of the PV cascaded inverter employing the first embodiment for leakage current suppression in accordance with the present invention.

The equivalent circuit 300 of the PV cascaded inverter using leakage suppression system 200 of FIG. 2 is illustrated with reference to FIG. 3. The equivalent circuit 300 includes the two commond mode capacitors 245a, 245b, 245c, 245d and the parasitic capacitors 265a, 265b, 265c, 265d associated with each level of the inverter circuit. The equivalent circuit 300 further includes an inductance $L_{cm\_dc}+L_{cm\_ac}$ 380a, 380b, 380c, 380d which is a combination of the DC-side inductance and the AC-side inductance and the output inductors 255a, 255b. The voltage sources $v_{ia}$ 305a, 305b, 305c, 305d and $v_{ib}$(i=1,2, . . . ,n) 310a, 310b, 310c, 310d represent the two phase leg voltages of the ith cascaded module referring to the negative terminal of its DC bus. $v_{ia}$ 305a, 305b, 305c, 305d and $v_{ib}$ 310a, 310b, 310c, 310d mainly contain the DC component, fundamental frequency component and baseband harmonics, carrier harmonics and the related sideband harmonics. The carrier harmonics and the related sideband harmonics are the main contributors to the leakage current $i_{leak\_Hi}$, i=1,2, . . . ,n. 270a, 270b, 270c of the photovoltaic cascaded multilevel interver. The magnitude of these harmonics is dependent upon the PV string/panel output voltage and inverter modulation strategy. To better understand the suppression principle and introduce the filter design criteria, the analytical expression for the leakage current is derived based on the equivalent model. The xth inverter module is selected arbitrarily for the calculation.

According to the superposition theory, the branch current $i_{zx}$ 385 through the inductance $L_{cm\_dc}+L_{cm\_ac}$ 380a, 380b, 380c, 380d of the xth inverter module can be first calculated as in (1).

$$i_{Zx} = \frac{v_{1a} + v_{nb}}{Z_L + (Z_1 // \ldots // Z_n) // Z_L} \cdot \frac{(Z_1 // \ldots // Z_{x-1} // Z_{x+1} // \ldots // Z_n) // Z_L}{Z_x + (Z_1 // \ldots // Z_{x-1} // Z_{x+1} // \ldots // Z_n) // Z_L} + \sum_{i=2}^{x} \frac{v_{ia} - v_{(i-1)b}}{(Z_1 // \ldots // Z_{i-1}) // Z_L + (Z_i // \ldots // Z_n) // Z_L} \cdot \frac{(Z_i // \ldots // Z_{x-1} // Z_{x+1} // \ldots // Z_n) // Z_L}{Z_x + (Z_i // \ldots // Z_{x-1} // Z_{x+1} // \ldots // Z_n) // Z_L} + \sum_{i=x}^{n-1} \frac{v_{ib} - v_{(i+1)a}}{(Z_{i+1} // \ldots // Z_n) // Z_L + (Z_1 // \ldots // Z_i) // Z_L} \cdot \frac{(Z_1 // \ldots // Z_{x-1} // Z_{x+1} // \ldots // Z_i) // Z_L}{Z_x + (Z_1 // \ldots // Z_{x-1} // Z_{x+1} // \ldots // Z_i) // Z_L} \tag{1}$$

where $$Z_i = j\omega(L_{cm\_dc} + L_{cm\_ac}) + \frac{1}{j\omega(C_{pvi} + 2C_{cm})},$$

$i = 1, 2, \ldots, n$ and $Z_L = j\omega L$.

The contribution of the grid voltage to the ground leakage current 275 is relatively small, so it is ignored in the calculation.

Because $Z_L$ is usually much smaller than the impedance of $L_{cm\_dc}+L_{cm\_ac}$ 380a, 380b, 380c, 380d at the inverter switching frequency and above frequencies, the values of the terms containing $Z_L$ in (1) should have the same order of magnitude. Also the value of $(Z_i// \ldots //Z_{x-1}//Z_{x+1}//Z_n)//Z_L$ and $(Z_1// \ldots //Z_{x-1}//Z_{x+1}//Z_i)//Z_L$ should be close to the value of $Z_L$. As a result, eq. (1) can be simplified as in (2).

$$i_{Zx} \approx \frac{\sum_{i=1}^{x-1}(v_{ia} - v_{ib}) + \sum_{i=x+1}^{n}(v_{ib} - v_{ia}) + (v_{xa} + v_{xb})}{2(Z_x + Z_L)} \tag{2}$$

Figure 4:
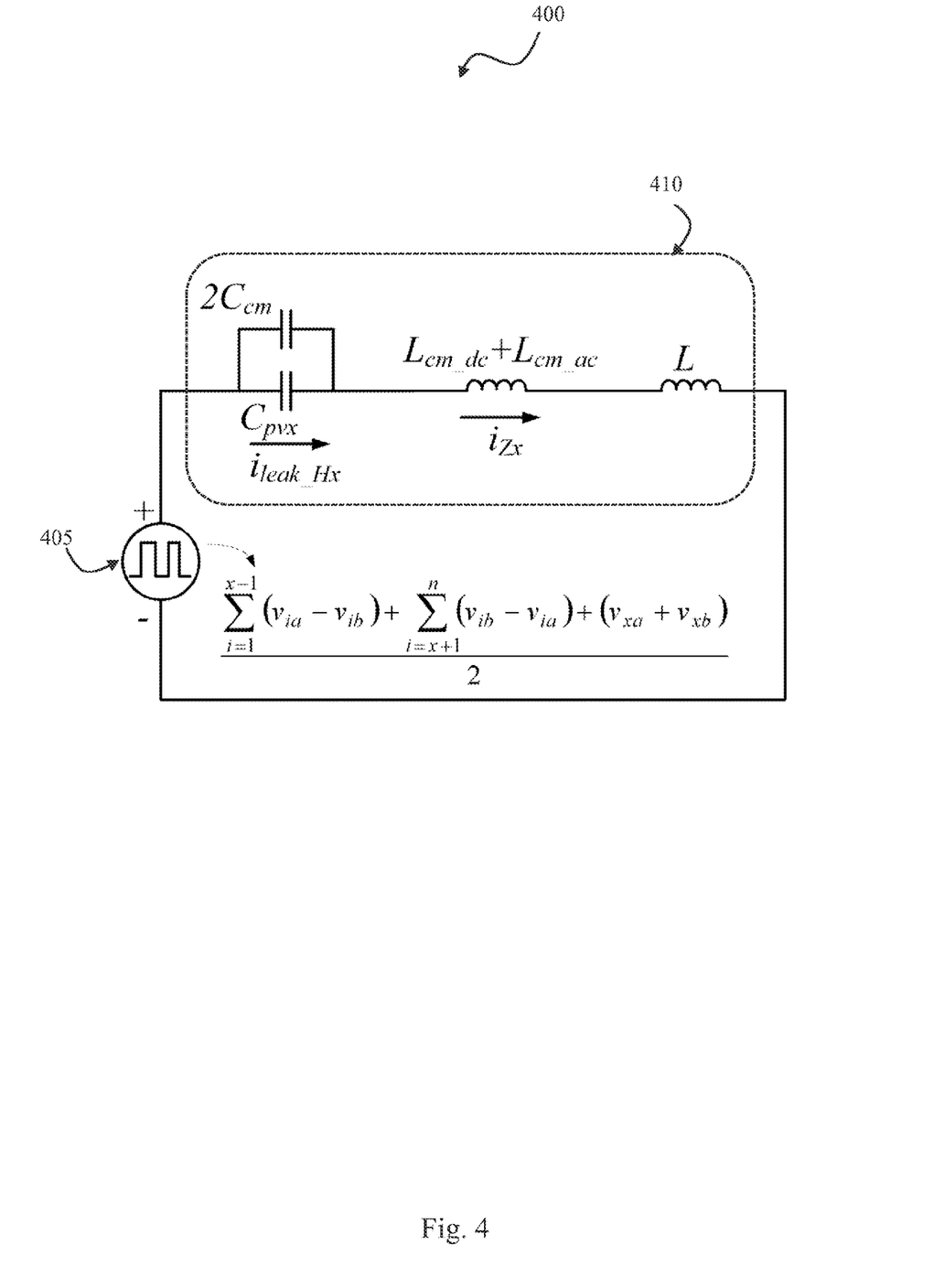
FIG. 4 is a circuit diagram illustrating a simplified leakage current analytical model in accordance with the first embodiment of the present invention.

The simplified model implies an equivalent circuit 400 as shown with reference to FIG. 4, which is composed of a voltage source 405 connected with an LC circuit in series 410. The voltage source 405 is related to the phase leg voltages of all cascaded inverter modules. The LC circuit is formed by $L_{cm\_dc}+L_{cm\_ac}+L$ and $C_{pvi}+2C_{cm}.i_{leak\_Hx}$ can be calculated by (3).

$$i_{leak\_Hx} = i_{Zx} \frac{C_{pvx}}{C_{pvx} + 2C_{cm}} \tag{3}$$

According to the simplified model, the impedance of $Z_x+Z_L$ should be designed large enough at the switching frequency to suppress the leakage current. The resonant frequency of $Z_x+Z_L$ needs to be much lower than the inverter switching frequency to fulfill that requirement. The final parameters of the filters can be designed using (2), providing that $v_{ia}$ and $v_{ib}$ (i=1,2, . . . ,n) are known. Because the capacitance of the CM capacitors $C_{cm}$ is usually limited by safety requirements, the resonant frequency of the formed LC filter cannot be designed very low, otherwise, large CM inductors are necessary. Therefore, this embodiment is more suitable for the cascaded multilevel inverter which is operating at a high switching frequency. The applicability of this embodiment, at a pre-selected switching frequency, depends upon the constraint of the filter size and cost.

Figure 5:
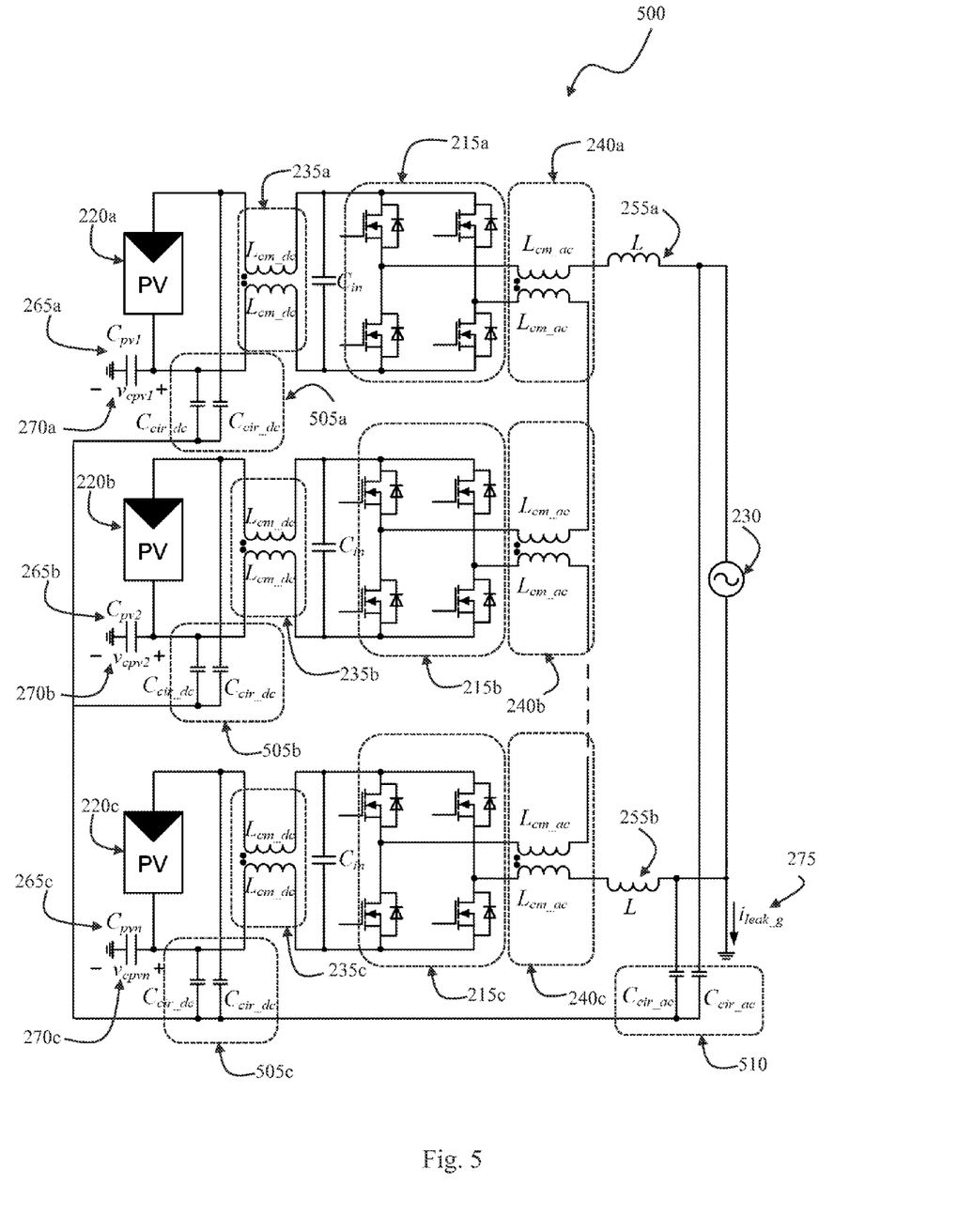
FIG. 5 is a circuit diagram of a PV cascaded multilevel inverter using a method of leakage current suppression in accordance with a second embodiment of the present invention.

In an additional embodiment, as illustrated with reference to FIG. 5, a current leakage suppression system 500 is realized by adding AC-side common mode chokes 240a, 240b, 240c and DC-side common mode chokes 235a, 235b, 235c as in the first embodiment, and capacitors $C_{cir\_dc}$ 505a, 505b, 505c and $C_{cir\_ac}$ 510. An extra current circulating path is formed among the common mode chokes 240a, 240b, 240c, 235a, 235b, 235c, bridges of the inverter modules 215a, 215b, 215c, and capacitors $C_{cir\_dc}$ 505a, 505b, 505c and $C_{cir\_ac}$ 510. The circulating path contains LC circuits whose resonant frequencies are designed to be lower than the inverter switching frequency. The carrier harmonics across the parasitic capacitors 265a, 265b, 265c can be attenuated by the formed LC circuits. The advantage of this solution is that the capacitance of $C_{cir\_dc}$ 505a, 505b, 505c and $C_{cir\_ac}$ 510 can be relatively large, so this embodiment can be applied for the inverter which is operating at a much lower switching frequency without using very large common mode chokes.

The leakage current suppression system 500 is realized by adding commond mode chokes $L_{cm\_dc}$ 235a, 235b, 235c and $L_{cm\_ac}$ 240a, 240b, 240c, DC-side circulating capacitors $C_{cir\_dc}$ 505a, 505b, 505c and AC-side circulating capacitor $C_{cir\_ac}$ 510. In this embodiment, there is a common connection point among the capacitors $C_{cir\_dc}$ 505a, 505b, 505c of each cascaded module and the AC-side capacitor $C_{cir\_ac}$ 510. An additional current circulating path is formed by the common mode chokes, bridges, and circulating capacitors $C_{cir\_dc}$ and $C_{cir\_ac}$. To better understand the suppression principle and introduce the filter design criteria, the analytical expression for the leakage current is derived.

Figure 6:
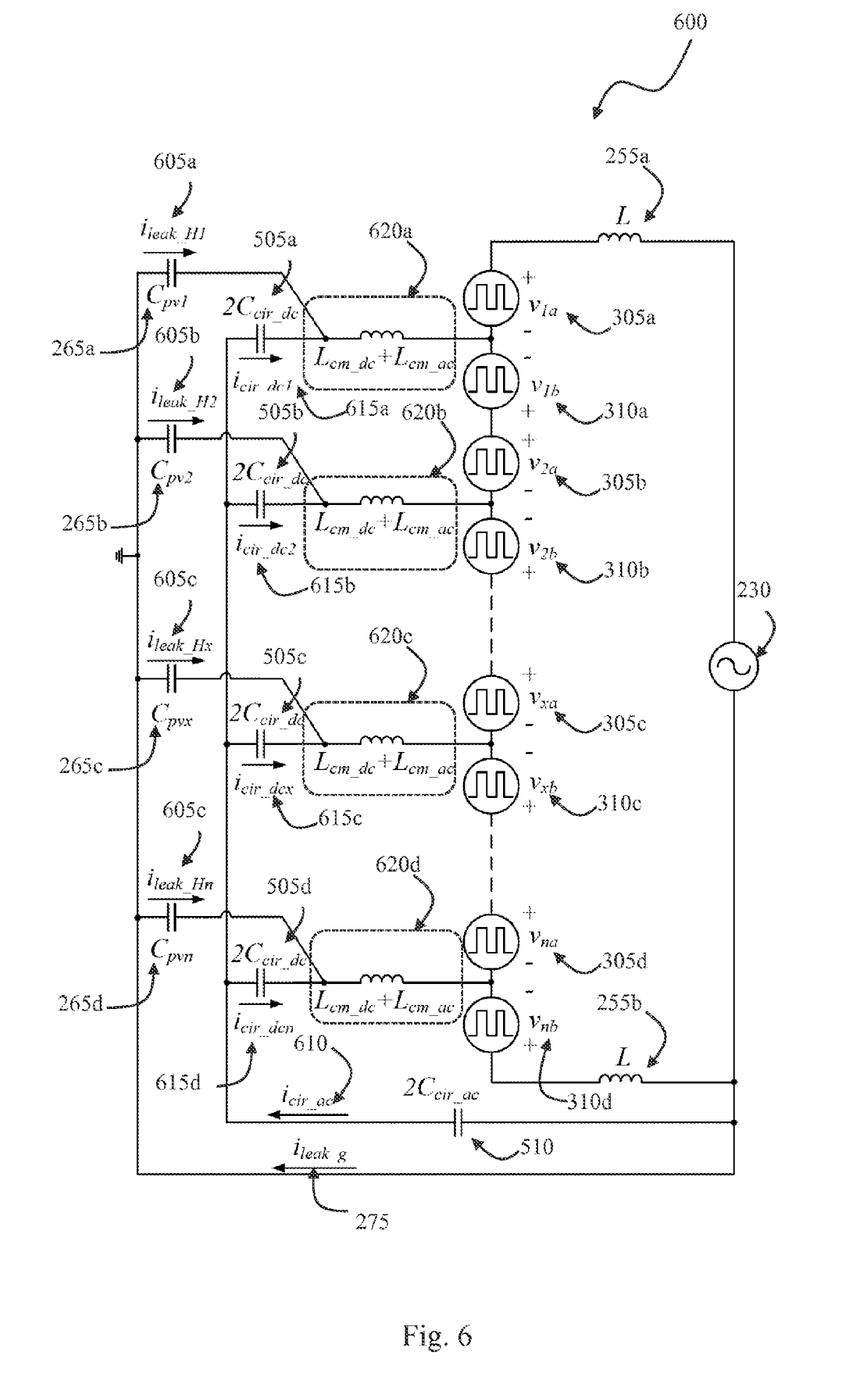
FIG. 6 is a circuit diagram illustrating an equivalent circuit of the PV cascaded inverter employing the second embodiment for leakage current suppression in accordance with the present invention.

As illustrated with reference to FIG. 6, in a system equivalent circuit 600 of FIG. 5, the current through the xth parasitic capacitor $i_{leak\_Hx}$ 605a, 605b, 605c, 605d is equal to $$i_{leak\_Hx} = i_{cir\_dcx} \frac{C_{pvx}}{2C_{cir\_dc}} + i_{cir\_ac} \frac{C_{pvx}}{2C_{cir\_ac}} \quad (4)$$

where $i_{cir\_dcx}$ 615a, 615b, 615c, 615d is the sum current through the two $C_{cir\_dc}$ capacitors 505a, 505b, 505c, 505d of the xth inverter module; $i_{cir\_ac}$ 610 is the total current through the two $C_{cir\_ac}$ capacitors 510. Usually $C_{cir\_ac}$ 510 and $C_{cir\_dc}$ 505a, 505b, 505c, 505d are designed to be much larger than the parasitic capacitance 265a, 265b, 265c, 265d, so we can get that $$\frac{c_{pvx}}{2C_{cir\_dc}} \ll 1$$

and $$\frac{c_{pvx}}{2C_{cir\_ac}} \ll 1.$$

Therefore, according to (4), $i_{leak\_Hx}$ 605a, 605b, 605c, 605d can be limited when the value of $i_{cir\_ac}$ 615a, 615b, 615c, 615d and $i_{cir\_ac}$ 610 are attenuated.

Based on the equivalent model, $i_{cir\_dcx}$ 615a, 615b, 615c, 615d and $i_{cir\_ac}$ 610 can be calculated as in (5) and (6) respectively.

$$i_{cir\_dcx} = \frac{v_{1a} + v_{nb}}{2Z + 2nZ_{cir\_ac} + nZ_L} + \quad (5)$$

$$\sum_{i=2}^{x}(v_{ia} - v_{(i-1)b}) \cdot \frac{\left(\frac{1}{i-1}Z + 2Z_{cir\_ac} + Z_L\right) \cdot \frac{(n-i+1)(i-1)}{n-i+2}}{Z(2Z + 2nZ_{cir\_ac} + nZ_L)} +$$

$$\sum_{i=x}^{n-1}(v_{ib} - v_{(i+1)a}) \cdot \frac{\left(\frac{1}{n-i+1}Z + 2Z_{cir\_ac} + Z_L\right) \cdot \frac{(n-i+1)(i-1)}{i}}{Z(2Z + 2nZ_{cir\_ac} + nZ_L)}$$

$$i_{cir\_ac} = \sum_{i=1}^{n} i_{cir\_dci} \quad (6)$$

where $Z_{cir\_ac} = 1/j2\omega C_{cir\_ac}$, $Z = j\omega(L_{cm\_dc} + L_{cm\_ac}) + 1/j2\omega C_{cir\_dc}$ and $Z_L = j\omega L$. Because the parasitic capacitance 265a, 265b, 265c, 265d is usually much smaller than $C_{cir\_ac}$ 505a, 505b, 505c, 505d and $C_{cir\_dc}$ 510, they are ignored in the calculation of $i_{cir\_dcx}$ 615a, 615b, 615c, 615d and $i_{cir\_ac}$ 610.

The expression $i_{cir\_dcx}$ in (5) is composed of three terms. In order to attenuate $i_{cir\_dcx}$ and $i_{cir\_ac}$, the denominators of the three terms should be designed large enough at the inverter switching frequency and at frequencies above the inverter switching frequency. The attenuation can be realized by designing the resonant frequencies of both impedance Z and ($2Z + 2nZ_{cir\_ac} + nZ_L$) lower than the inverter switching frequency. The final parameters of the filters 620a, 620b, 620c, 620d can be designed by using (4)-(6).

The present invention provides various embodiments for leakage current suppression for photovoltaic cascaded multilevel inverters. The leakage current suppression systems and methods in accordance with the present invention provide a reliable PV system based upon a cascaded multilevel inverter.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A system for leakage current suppression in a photovoltaic cascaded multilevel inverter, the system comprising:
   a photovoltaic cascaded inverter, the photovoltaic cascaded inverter comprising a plurality of cascaded inverter modules, each of the plurality of cascaded inverter modules comprising a DC-side and an AC-side, wherein the DC-side of each of the plurality of cascaded inverter modules is coupled to one of a plurality of photovoltaic DC voltage sources and the AC-side of each of the plurality of cascaded inverter modules are coupled in series with each other, and each of the plurality of cascaded inverter modules further comprising;
   a common mode DC-side choke coupled to the DC-side of the inverter module;
   a common mode AC-side choke coupled to the AC-side of the inverter module;
   a first common mode capacitor having a first terminal and a second terminal, wherein the first terminal is coupled to the common mode DC-side choke and to a positive terminal of the photovoltaic DC voltage source and the second terminal is coupled to ground; and
   a second common mode capacitor having a first terminal and a second terminal, wherein the first terminal is coupled to the common mode DC-side choke and to a negative terminal of the photovoltaic DC voltage source and the second terminal is coupled to ground.

2. The system of claim 1, wherein each of the plurality of cascaded inverter modules further comprises at least one inverter circuit coupled between the DC-side and the AC-side of the cascaded inverter module.

3. The system of claim 1, wherein each of the plurality of cascaded inverter modules further comprises at least one H-bridge inverter coupled between the DC-side and the AC-side of the cascaded inverter module.

4. The system of claim 1, wherein the photovoltaic DC voltage source is a photovoltaic DC voltage source of a photovoltaic array of DC voltage sources.

5. The system of claim 1, wherein each of the plurality of cascaded inverter modules further comprises a DC-link capacitor coupled between the DC-side choke and the DC-side of each of the inverter module.

6. The system of claim 1, further comprising two same split inductors coupled between an output of the photovoltaic cascaded inverter and a ground node.

7. The system of claim 1, wherein each of the plurality of cascaded inverter modules further comprises a parasitic capacitor coupled between an input to the photovoltaic DC voltage source and a ground node.

8. The system of claim 1, wherein the parameters of the DC-side choke, AC-side choke and common mode capacitors of each of the plurality of cascaded inverter modules are designed to suppress the leakage current of the cascaded inverter.

9. The system of claim 1, wherein the DC-side choke, the AC-side choke and the common mode capacitors of each of the plurality of cascaded inverter modules are designed to have a resonant frequency that is substantially lower than a switching frequency of the photovoltaic cascaded inverter.

10. A method for suppressing leakage current in a photovoltaic cascaded multilevel inverter, the method comprising:

coupling a DC-side of each of a plurality of cascaded inverter modules of a photovoltaic cascaded inverter to one of a plurality of photovoltaic DC voltage sources and coupling an AC-side of each of the plurality of cascaded inverter modules in series with each other;

coupling a common mode DC-side choke to the DC-side of each of the plurality of cascaded inverter modules of the photovoltaic cascaded inverter;

coupling a common mode AC-side choke to an AC-side of each of a plurality of cascaded inverter modules of the photovoltaic cascaded inverter;

coupling a DC-Link capacitor between the common mode DC-side choke and the DC-side of each of the plurality of cascaded inverter modules of the photovoltaic cascaded inverter;

coupling a first common mode capacitor to the DC-side of each of the plurality of cascaded inverter modules, wherein a first terminal of the first common mode capacitor is coupled to the common mode DC-side choke and to a positive terminal of the photovoltaic DC voltage source and a second terminal of the first common mode capacitor is coupled to ground;

coupling a second common mode capacitor to the DC-side of each of the plurality of cascaded inverter modules, wherein a first terminal of the second common mode capacitor is coupled to the common mode DC-side choke and to a negative terminal of the photovoltaic DC voltage source and a second terminal of the second common mode capacitor is coupled to ground; and suppressing a leakage current in each of the plurality of cascaded inverter modules of the photovoltaic cascaded inverter using the DC-side choke, the AC-side choke, the first common mode capacitor and the second common mode capacitor.

11. The method of claim 10, further comprising designing the DC -side choke, the AC-side choke, the first common mode capacitor and the second common mode capacitor to have a resonant frequency that is substantially lower than a switching frequency of the photovoltaic cascaded inverter.

12. The method of claim 10, further comprising selecting the parameters of the DC-side choke, AC-side choke, the first common mode capacitor and the second common mode capacitor to suppress the leakage current of the each of the plurality of cascaded inverter modules of the photovoltaic cascaded multilevel inverter.

* * * * *